United States Patent Office 3,519,709
Patented July 7, 1970

3,519,709
PHOSPHORUS CONTAINING DITHIOCARBAMATES
Roger Williams Addor, Pennington, N.J., assignor to American Cyanamid Company, Stamford, Conn., a corporation of Maine
No Drawing. Filed Mar. 28, 1967, Ser. No. 626,403
Int. Cl. A01n *9/36;* C07c *155/08;* C07f *9/24*
U.S. Cl. 260—455      6 Claims

ABSTRACT OF THE DISCLOSURE

Dithiocarbamate esters represented by the formula:

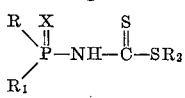

wherein R and $R_1$ are each (lower)alkyl, (lower)alkoxy or phenyl; X is sulfur or oxygen; and $R_2$ is (lower)alkyl, benzyl, halo-substituted benzyl, allyl, (lower)alkylally, or (lower)carbalkoxy (lower)alkyl substituent, are provided. They are prepared by subjecting either a mixture of a phosphinyl or phosphinothioyl isothiocyanate and an alkali metal hydrosulfide to the action of an alkylating agent or initially reacting the latter hydrosulfide-isothiocyanate mixture to obtain a dithiocarbamate salt, and thereafter converting the salt so formed to a thioester by reaction with an alkylating reagent. They are useful as insecticides.

---

The present invention relates to dithiocarbamate esters, to methods for preparing the same and has as its principal object the utilization of such esters as the active component of an insecticidal composition. More particularly, it relates to dithiocarbamate esters represented by the formula:

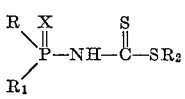

wherein R and $R_1$ are each (lower)alkyl, (lower)alkoxy or phenyl; X is sulfur or oxygen; and $R_2$ is (lower(alkyl, benzyl, halo-substituted benzyl, allyl, (lower)alkylally, or (lower)carbalkoxy (lower)alkyl substituent. Still more particularly, the invention is concerned with a process for preparing the class of novel esters aforementioned which comprises: subjecting either a mixture of phosphinyl or phosphinothioyl isothiocyanate and an alkali metal hydrosulfide to the action of an alkylating agent or initially reacting the latter hydrosulfide-isothiocyanate mixture to obtain a dithiocarbamate salt, and thereafter converting the salt so-formed to a thio-ester by reaction with an alkylating reagent.

Exemplary compounds falling within the purview of the present invention are:

Methyl dimethylphosphinothioyldithiocarbamate,
Methyl diethylphosphinyldithiocarbamate,
Ethyl methylmethoxyphosphinyldithiocarbamate,
Methyl ethoxyphenylphosphinothioyldithiocarbamate,
Ethyl ethoxyphenylphosphinothioyldithiocarbamate,
Benzyl methylethylphosphinyldithiocarbamate,
Carboethoxymethyl dimethylphosphinothioyldithiocarbamate,
Allyl ethoxymethylphosphinyldithiocarbamate,
p-Chlorobenzyl dimethylphosphinothioyldithiocarbamate,
m-Chlorobenzyl methylmethoxyphosphinyldithiocarbamate,
Ethallyl diethoxyphosphinothioyldithiocarbamate,
Methallyl dimethylphosphinyldithiocarbamate,
p-Bromobenzyl ethoxyphenylphosphinothioyldithiocarbamate, and
Isopropyl dimethylphosphinyldithiocarbamate.

Advantageously, the compounds of the present invention can be prepared in a straightforward manner. In a preferred embodiment, a phosphinyl or phosphinothioyl isothiocyanate and an alkali metal hydrosulfate are mixed in an inert solvent and the solution or suspension of the resultant alkali metal salt of a phosphinyl- or phosphinothioyldithiocarbamate is then reacted with one equivalent of a suitable alkylating agent. The overall reactions can be graphically written as follows:

(I) 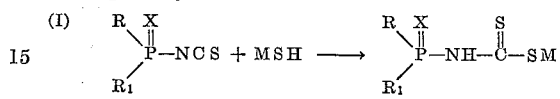

and (II) 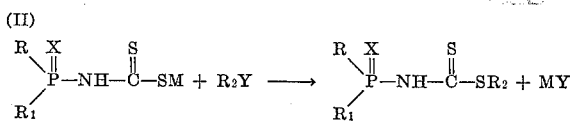

wherein R, $R_1$, $R_2$ and X are the same substituents as defined above, and Y is a halogen, such as chlorine, bromine or iodine, sulfate, or p-toluenesulfonyl and equivalents thereof, and M is an alkali metal, such as sodium, potassium or lithium.

The overall reaction is carried out in a suitable solvent, such as methanol, ethanol, propanol, benzene, dimethylformamide or dimethylsulfoxide. Resultant dithiocarbamate product is readily recovered from the solution by removal of solvent, such as on a film-type evaporator. Utilizing solvents such as dimethylformamide, the reaction mixture is initially diluted with water and the product is then extracted with ether or benzene.

As indicated above, the dithiocarbamate salts as formed can be directly reacted, preferably without separation, with an alkylating agent, such as methyl iodide, n-propyl bromide, allyl chloride, benzyl bromide, methyl bromoacetate, methyl sulfate and equivalents thereof. Alternatively, the dithiocarbamate salts can, if desired, be isolated prior to alkylation.

The following examples are presented primarily for purposes of illustrating more specific details of the invention which are not to be taken as limitative. Unless otherwise specified, parts are by weight and the analyses are in percent.

EXAMPLE 1

Preparation of product.—methyl diethoxyphosphinyldithiocarbamate

To an ice-cooled mixture of 6.4 grams (0.024 mole) of potassium diethoxyphosphinyldithiocarbamate in 75 ml. of dry ethers is added in about five minutes 1.5 ml. (0.023 mole) of methyl iodide in 10 ml. of ether. The ice-bath is then removed and after three hours another 0.1 ml. of methyl iodide is added to the latter mixture. After stirring overnight, the mixture is filtered and resultant filtrate is concentrated in vacuo leaving a light yellow fluid solid. Recrystallization from about 150 ml. of hexane yields 4.3 grams (76%) of pale yellow plates, having a melting point of 69.8° C.–72.0° C. The product is then recrystallized from ether to obtain a melting point of 71.0° C.–72.0° C.

Analysis.—Calc'd for $C_6H_{14}NO_3PS_2$ (percent): C, 29.62; H, 5.80; N, 5.76; P, 12.73; S, 26.36. Found (percent): C, 29.78; H, 6.31; N, 5.86; P, 12.48; S, 25.91.

EXAMPLE 2

The procedure of Example 1 is repeated in every detail except that methyl iodide is separately replaced with (A) n-propyl bromide (B) allyl chloride, (C) benzyl bromide and (D) methyl bromoacetate to correspondingly form:

(A′) n-Propyl diethoxyphospinyldithiocarbamate which possesses a melting point of 49° C.–50° C. and analyzes as follows:

Calc'd for $C_8H_{18}NO_3PS_2$ (percent): C, 35.41; H, 6.68; N, 5.16; P, 11.41; S, 23.64. Found (percent): C, 35.54; H, 6.76; N, 5.21; P, 11.22; S, 23.49.

(B′) Allyl diethoxyphosphinyldithiocarbamate which is an oil at room temperature and analyzes as:

Calc'd for $C_8H_{16}NO_3PS_2$ (percent): C, 35,67; H, 5.99; N, 5.20; P, 11.50; S, 23.81. Found (percent): C, 35.67; H, 6.07; N, 5.32; P, 11.71; S, 23.60.

(C′) benzyl diethoxyphosphinyldithiocarbamate which possesses a melting point equal to 104°C.–105° C. and analyzes as:

Calc'd for $C_{12}H_{18}NO_3PS_2$ (percent): C, 45.12; H, 5.69; N, 4.38; P, 9.70; S, 20.08. Found (percent): C, 45.15; H, 5.66; N, 4.38; P, 9.61; S, 20.20.

(D′) Carbomethoxymethyl diethoxyphosphinyldithiocarbamate which is an oil and exhibits a refractive index ($n_D^{25}$) equal to 1.5214 whose analysis is:

Calc'd for $C_8H_{16}NO_5PS_2$ (percent): C, 31.89; H, 5.35; N, 4.65; P, 10.28; S, 21.28. Found (percent): C, 32.08; H, 5.16; N, 4.91; P, 10.36; S, 21,18.

EXAMPLE 3

Preparation of product.—Methyl diisopropoxyphosphinyldithiocarbamate

The procedure of Example 1 is repeated in every detail except that potassium diethoxyphosphinyldithiocarbamate is replaced by potassium diisopropoxyphosphinyldithiocarbamate and methanol replaces ether as the solvent. Product is recrystallized from hexane to obtain 57% of compound, melting point 80° C.–82° C. After several recrystallizations from hexane, a sample melted at 83.0° C.–84.4° C.

Analysis.—Calc'd for $C_8H_{18}NO_3PS_2$ (percent): C, 35.41; H, 6.69; N, 5.16; P, 11.42; S, 23.63. Found (percent): C, 35.66; H, 6.65; N, 5.27; P, 11.34; S, 23.58.

EXAMPLE 4

Preparation of product.—methyl diethoxyphosphinothioyldithiocarbamate

An ice-cooled mixture of 11 parts of sodium hydroxide in 250 parts (by volume) of methanol is saturated with hyydrogen sulfide. Addition of 50 parts of diethoxyphosphinothioyl isothiocyanate is followed by addition of 38 parts of methyl iodide. The mixture, after stirring overnight, is concentrated in vacuo and the residue partitioned between a benzene/water mixture. The benzene layer is separated, water-washed and concentrated to yield an oil: methyl diethoxyphosphinothioyldithiocarbamate in good yield.

In similar manner as in Example 4 but employing ethoxyphenylphosphinothioyl isothiocyanate, there is obtained a good yield of methyl ethoxyphenylposphinothioyldithiocarbamate.

It is anadvantage of the present invention that the compuonds hereinabove defined can be utilized by incorporating them into a variety of inert carriers or diluents. For instance, each of the compounds can be dissolved in an inert organic solvent, such as acetone, ethyl acetate, ethyl alcohol, benzene, xylene, kerosene or equivalents thereof; or the compounds may be admixed with an inert solid carrier, as for example, fuller's earth, precipitated hydrated silicon dioxide, activated carbon, bentonite, attaclay, Celite, kaolin clay, a mixture of bentonite and attapulgite and the like. If desired, a suspension of the compounds may be prepared by employing a non-solvent therefor. In that event, it is advantageous to add thereto any commercially available dispersing or surface-active agent of the anionic, cationic or nonionic types, or mixtures of the same. Illustrative surface-active agents are: the alkylaryl sulfonates, the calcium salt of an oil-soluble sulfonate and polyoxyethylene ethers, such as "Emcol H 140," the sodium salt of a polymerized propyl naphthalene sulfonic acid, formed by condensing formaldehyde with a propyl naphthalene sodium sulfonate, the alkylaryl polyether alcohols, the ethylene oxide addition products of such ethers as, for instance, "Tween–20," and the like. Usually, from one to five parts of dispersing agent per one-hundred parts of active compound is a good operating range.

The quantity of inert solid or liquid carrier or diluent employed with respect to the insecticidal compounds can be widely varied. It has, however, been found that, depending upon the carrier employed, from about 1% to about 80%, and preferably from about 20% to 70% by weight of the compound, based on the weight of the inert carirer, is wholly satisfactory.

The rate of application of the overall composition as applied to foliage, soil or seed can be widely varied. For instance, when applied to foliage, a convenient rate is found to be between 0.25 and 2 pounds of active compound per acre. As to soil application, for both insecticidal and nematocidal activity, a good operating rate is found to be between one and ten pounds of active compound per acre. Finally, seeds can effectively be treated at a rate between about one to eight pounds by weight of the compound per one-hundred pounds of seed.

To demonstrate the effectiveness of the compounds of the present invention with respect to insecticidal activity, the following examples are presented.

EXAMPLE 5

Southern armyworm (*Prodenia eridania* Cram.)

Compounds to be tested are made up as 0.1% solutions in 65% acetone/35% water. Sieva lima bean leaves are dipped in the test solution and set in the hood to dry. When dry, they are placed in four-inch petri dishes which have a moist filter paper in the bottom, and ten third-instar armyworm larvae about ⅜″ long are added to each dish. The dishes are covered and held at 80° F., 60% R.H. After two days, mortality counts and estimates of the amount of feeding are made. The results appear in Table I below.

| Structure of test compound | Percent kill |
| --- | --- |
| $(C_2H_5O)_2\overset{O}{\overset{\|}{P}}-NH-\overset{S}{\overset{\|}{C}}-SCH_3$ | 100 |
| $(C_2H_5O)_2\overset{O}{\overset{\|}{P}}-NH-\overset{S}{\overset{\|}{C}}-SC_3H_7$ | 100 |
| $(C_2H_5O)_2\overset{O}{\overset{\|}{P}}-NH-\overset{S}{\overset{\|}{C}}-SCH_2CH=CH_2$ | 100 |
| $(C_2H_5O)_2\overset{O}{\overset{\|}{P}}-NH-\overset{S}{\overset{\|}{C}}-SCH_2C_6H_5$ | 100 |
| $(C_2H_5O)_2\overset{O}{\overset{\|}{P}}-NH-\overset{S}{\overset{\|}{C}}-SCH_2\overset{O}{\overset{\|}{C}}OCH_3$ | 100 |

EXAMPLE 6

Compounds are tested as 0.1% and 0.01% solutions or suspensions in 65% acetone/35% water. Two-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F. and 50% R.H. Test results appear in Table II below.

TABLE II

| Structure of test compound | Concentrations | |
|---|---|---|
| | 0.1% | 0.01% |
| $(C_2H_5O)_2\overset{O}{\overset{\|}{P}}-NH-\overset{S}{\overset{\|}{C}}-SCH_3$ | 100 | 100 |
| $(i\text{-}C_3H_7O)_2\overset{O}{\overset{\|}{P}}-NH-\overset{S}{\overset{\|}{C}}-SCH_3$ | 100 | 100 |
| $(C_2H_5O)_2\overset{O}{\overset{\|}{P}}-NH-\overset{S}{\overset{\|}{C}}-SC_3H_7$ | 100 | 100 |
| $(C_2H_5O)_2\overset{O}{\overset{\|}{P}}-NH-\overset{S}{\overset{\|}{C}}-SCH_2CH=CH_2$ | 100 | 99 |
| $(C_2H_5O)_2\overset{O}{\overset{\|}{P}}-NH-\overset{S}{\overset{\|}{C}}-SCH_2C_6H_5$ | 100 | 100 |
| $(C_2H_5O)_2\overset{O}{\overset{\|}{P}}-NH-\overset{S}{\overset{\|}{C}}-SC_6H_5$ | 100 | 20 |
| $(C_2H_5O)_2\overset{O}{\overset{\|}{P}}-NH-\overset{S}{\overset{\|}{C}}-SCH_2\overset{O}{\overset{\|}{C}}OCH_3$ | 100 | 100 |

EXAMPLE 7

Two-spotted spider mite (*Tetranychus telarius* L.)

Compounds to be tested are made up as .01% solutions in 65% acetone/35% water. Sieva lima bean plants with the first pair of leaves three to four inches in size are infested about five hours before testing, using about 100 to 200 adult mites per leaf. The infested leaves are dipped in the test solutions (in four-inch crystallizing dishes) for three seconds, and the plants set in the hood to dry. The treated plants are held for two days at 80° F., 60% R.H., and the adult mite mortality calculated by counting dead and alive adults on one leaf under the 10× binocularscope. The other leaf is held an additional five days and then is examined at 10× power to estimate the kill of eggs and newly-hatched nymphs, giving a measure of ovocidal and residual action, respectively. The results are given in Table III below.

TABLE III

| Structure of test compound | Percent kill |
|---|---|
| $(C_2H_5O)_2\overset{O}{\overset{\|}{P}}-NH-\overset{S}{\overset{\|}{C}}-SCH_3$ | 100 |
| $(C_2H_5O)_2\overset{O}{\overset{\|}{P}}-NH-\overset{S}{\overset{\|}{C}}-SC_3H_7$ | 100 |
| $(C_2H_5O)_2\overset{O}{\overset{\|}{P}}-NH-\overset{S}{\overset{\|}{C}}-SCH_2CH=CH_2$ | 100 |
| $(C_2H_5O)_2\overset{O}{\overset{\|}{P}}-NH-\overset{S}{\overset{\|}{C}}-SCH_2C_6H_5$ | 80 |
| $(C_2H_5O)_2\overset{O}{\overset{\|}{P}}-NH-\overset{S}{\overset{\|}{C}}-SC_6H_5$ | 64 |
| $(C_2H_5O)_2\overset{O}{\overset{\|}{P}}-NH-\overset{S}{\overset{\|}{C}}-SCH_2\overset{O}{\overset{\|}{C}}OCH_3$ | 69 |

EXAMPLE 8

Groups of 25 adult female houseflies are lightly anesthetized with carbon dioxide, placed in wide-mouth mason jars and covered with a screen cap. The test compound is formulated as an emulsion containing 50 p.p.m. of test material, an emulsifier, acetone, and water. The mouth of the vial is covered with a single layer of cheesecloth, inverted, and placed on the screen cap so that the flies can feed on the solution through the screen. Mortality counts are made after two days at 80° F. The results appear below in Table IV.

TABLE IV

| Structure of test compound | Percent kill |
|---|---|
| $(C_5H_5O)_2\overset{O}{\overset{\|}{P}}-NH-\overset{S}{\overset{\|}{C}}-SCH_3$ | 100 |
| $(i\text{-}C_3H_7O)_2\overset{O}{\overset{\|}{P}}-NH-\overset{S}{\overset{\|}{C}}-SCH_3$ | 100 |
| $(C_2H_5O)_2\overset{O}{\overset{\|}{P}}-NH-\overset{S}{\overset{\|}{C}}-SC_3H_7$ | 100 |
| $(C_2H_5O)_2\overset{O}{\overset{\|}{P}}-NH-\overset{S}{\overset{\|}{C}}-SCH_2C_6H_5$ | 100 |

EXAMPLE 9

The compound is formulated as a dust and incorporated into the soil at the equivalent of fifty pounds per acre. The soil is sub-sampled into bottles and ten 6- to 8-day old rootworm larvae are added to each bottle, which is then capped. Mortality counts are made after six days at 80° F., 60% R.H. Test results appear in Table V below.

TABLE V

| Structure of test compound | Percent kill |
|---|---|
| $(C_2H_5O)_2\overset{O}{\overset{\|}{P}}-NH-\overset{S}{\overset{\|}{C}}-SCH_3$ | 100 |
| $(i\text{-}C_3H_7O)_2\overset{O}{\overset{\|}{P}}-NH-\overset{S}{\overset{\|}{C}}-SCH_3$ | 100 |
| $(C_2H_5O)_2\overset{O}{\overset{\|}{P}}-NH-\overset{S}{\overset{\|}{C}}-SCH_2CH=CH_2$ | 100 |
| $(C_2H_5O)_2\overset{O}{\overset{\|}{P}}-NH-\overset{S}{\overset{\|}{C}}-SC_3H_7$ | 100 |

It will, therefore, be seen from a study of each of the foregoing tabularized results that the compounds of the present invention are effective insecticides and advantageously may be used as such.

I claim:
1. A compound of the formula:

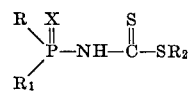

wherein R and $R_1$ are each (lower)alkoxy, $R_2$ represents (lower)alkyl, benzyl, halo-substituted benzyl, alkyl, (lower)alkyl allyl or (lower)carbalkoxy (lower)alkyl; and X represents sulfur or oxygen.

2. The compound according to claim 1 wherein R and $R_1$ are each (lower)alkoxy and X is oxygen.

3. The compound according to claim 1: methyl diethoxyphosphinyldithiocarbamate.

4. The compound according to claim 1: n-propyl diethoxyphosphinyldithiocarbamate.

5. The compound to claim 1: benzyl diethoxyphosphinyldithiocarbamate.

6. The compound according to claim 1: methyl diisopropoxyphosphinyldithiocarbamate.

References Cited

UNITED STATES PATENTS 3,136,801   6/1964   Hopkins _____ 260—455

(Other references on following page)

FOREIGN PATENTS 733,130    4/1966    Canada.

OTHER REFERENCES

Kharasch: "Org. Sulfur Compounds," vol. 1 (1961), p. 333.

Thorn et al.: "The Dithiocarbamates and Related Compounds" (1962), pp. 79–80.

CHARLES B. PARKER, Primary Examiner

D. R. PHILLIPS, Assistant Examiner

U.S. Cl. X.R.

47—57.6; 260—513.5, 959; 424—215